United States Patent [19]

Falcoff

[11] Patent Number: 4,614,300
[45] Date of Patent: Sep. 30, 1986

[54] COMPUTERIZED SPRAY MACHINE
[75] Inventor: Allan F. Falcoff, Lake Orion, Mich.
[73] Assignee: E. I. Du Pont de Nemours and Company, Wilmington, Del.
[21] Appl. No.: 595,726
[22] Filed: Apr. 2, 1984

Related U.S. Application Data

[63] Continuation-in-part of Ser. No. 369,935, Apr. 19, 1982, abandoned.

[51] Int. Cl.⁴ ............................................. B67D 5/08
[52] U.S. Cl. ...................................... 239/71; 239/69; 239/302; 118/697; 118/698
[58] Field of Search ................... 239/69, 74, 184, 302, 239/67, 71, 63; 118/696, 697, 698, 704

[56] References Cited

U.S. PATENT DOCUMENTS

| | | | |
|---|---|---|---|
| 3,155,539 | 11/1964 | Juvinall | 118/11 |
| 3,444,839 | 5/1964 | Ellul | 118/2 |
| 3,453,983 | 7/1969 | Rose | 118/7 |
| 3,593,308 | 7/1971 | Fagan | 340/172.5 |
| 3,646,521 | 2/1972 | Porter | 340/172.5 |
| 3,674,207 | 7/1972 | Carbonetti | 239/69 |
| 3,739,742 | 6/1972 | Racz et al. | 118/2 |
| 3,989,003 | 11/1976 | Fagan et al. | 118/2 |
| 4,278,046 | 7/1981 | Clark et al. | 118/695 |
| 4,278,132 | 7/1981 | Hostettor | 239/67 |
| 4,357,900 | 11/1982 | Buschor | 118/681 |

FOREIGN PATENT DOCUMENTS

| | | |
|---|---|---|
| 1253099 | 11/1971 | United Kingdom . |
| 2064826 | 6/1981 | United Kingdom ................ 239/63 |
| 2070281 | 9/1981 | United Kingdom . |

Primary Examiner—Andres Kashnikow
Assistant Examiner—Scott Malpede
Attorney, Agent, or Firm—Hilmar L. Fricke

[57] ABSTRACT

An improved paint spray machine having a spray gun with an adjustable spray nozzle, apparatus for controlling the speed and acceleration of the horizontal and vertical movement of the gun, apparatus for controlling the number of passes by the gun, apparatus for controlling the dwell period at the end of each pass and apparatus for controlling flash time between coats of paint; wherein the improvement is the following: (1) a computer system: (a) capable of storing programs for multiple paint spray procedures with their specific operating parameters; and (b) capable of actuating, monitoring and correcting parameters of a spray procedure so as to insure accurate spray application of the paint; and (2) optionally, apparatus for connecting the spray machine to a remote computer system and apparatus for controlling the flow of paint to the spray gun.

5 Claims, 4 Drawing Figures

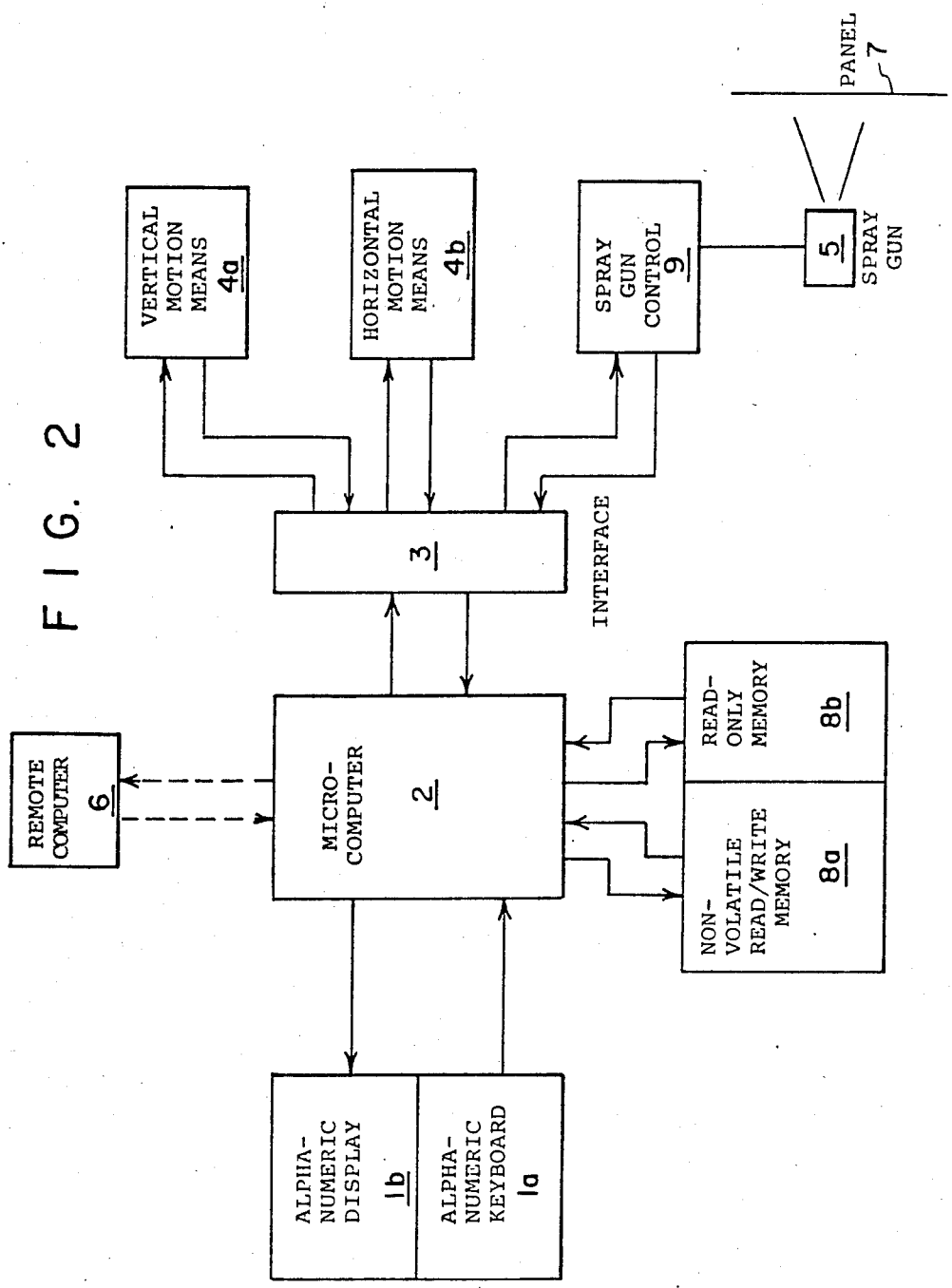

COMPUTERIZED SPRAY MACHINE

CROSS REFERENCE TO RELATED APPLICATIONS

This application is a continuation-in-part application of Ser. No.: 369,935, filed Apr. 19, 1982 now abandoned.

BACKGROUND OF THE INVENTION

1. Field of the Invention

The present invention is related generally to paint spraying machines, especially those utilized to prepare panels that can be used as paint standards. More particularly, the invention relates to a spray machine that is controlled automatically by a computer system that allows diverse spray procedures to be quickly and easily selected.

2. Description of Related Art

Automated paint spraying systems are well-known for use along assembly lines. As an example, see U.S. Pat. No. 3,989,003 ('003), issued Nov. 2, 1976 to Fagan and Bania. '003 discloses a system comprising conveyor means that carry an object by a spray gun, that is controlled by memory means that have been programmed with data relating to object style and object position relative to the spray gun. U.S. Pat. No. 3,739,742 ('742), issued June 19, 1973 to Racz and Higgins, has similar disclosure.

Spray machines also are well-known in the paint industry, for use in preparing painted panels. Certain panels serve as standards. Other panels are then compared against the standards, and if there is a color or other quality discrepancy, the batch of paint with which the panel was sprayed is modified accordingly.

A typical spray machine uses a spray gun with drive means that are capable of being set to control horizontal and vertical movement of the gun, as well as speed of the gun. Other variables of the spray machine capable of being set include the number of passes of the gun (related to paint fan spray pattern of the gun), the flash period after each coat (to allow solvent evaporation), the width of the spray stroke, the number of coats of paint and the like.

Any particular paint will have unique spray characteristics and the spray machine must be set accordingly so that spray times, gun traverse velocity, flash interval times, vertical panel indexing and the like are compatible with the paint being sprayed. Prior to the present invention, such variables were set manually, which required extensive time. Once a machine was set for a particular paint, it was dedicated to be used only with that paint and not used for other paints because of the lengthy time required to readjust the machine. However, with the computer controlled spray machine of the present invention, a single spray machine can easily and quickly be adjusted to spray all types of paint.

SUMMARY OF THE INVENTION

The present invention provides for an improved paint spray machine of the type comprising at least one spray gun with an adjustable spray nozzle, means for controlling the speed and acceleration of the horizontal and vertical movement of the gun, means for controlling the number of passes by the gun, means for controlling the dwell period at the end of each pass and means for controlling flash time between coats of paint; wherein the improvement comprises a computer system:

i. having a memory storage means for storing programs for multiple paint spray procedures with specific operating parameters of spray gun movement and paint flow to the spray gun for such procedures;

ii. coupled to means capable of actuating, monitoring and correcting parameters of movement of the spray gun and paint flow to the spray gun to insure accurate spray application of a paint;

iii. having feedback encoders which supply the computer with data of movement of the spray gun and paint flow to the spray gun so that the computer corrects for any discrepance between operating parameters of a spray procedure as programmed and the actual parameters being carried out;

iv. coupled to means that control and correct flow of paint and to the gun from the pressure vessel containing paint; and v. having a keyboard with display means; wherein an operator of the spray machine can program spray procedure into the computer system by using the keyboard, with prompting from the computer via the display means.

BRIEF DESCRIPTION OF DRAWINGS

FIG. 2 is a more detailed schematic representation of the computer system as it relates to the spray gun and the drive controls of the spray gun.

DETAILED DESCRIPTION OF THE INVENTION

Figure 1:
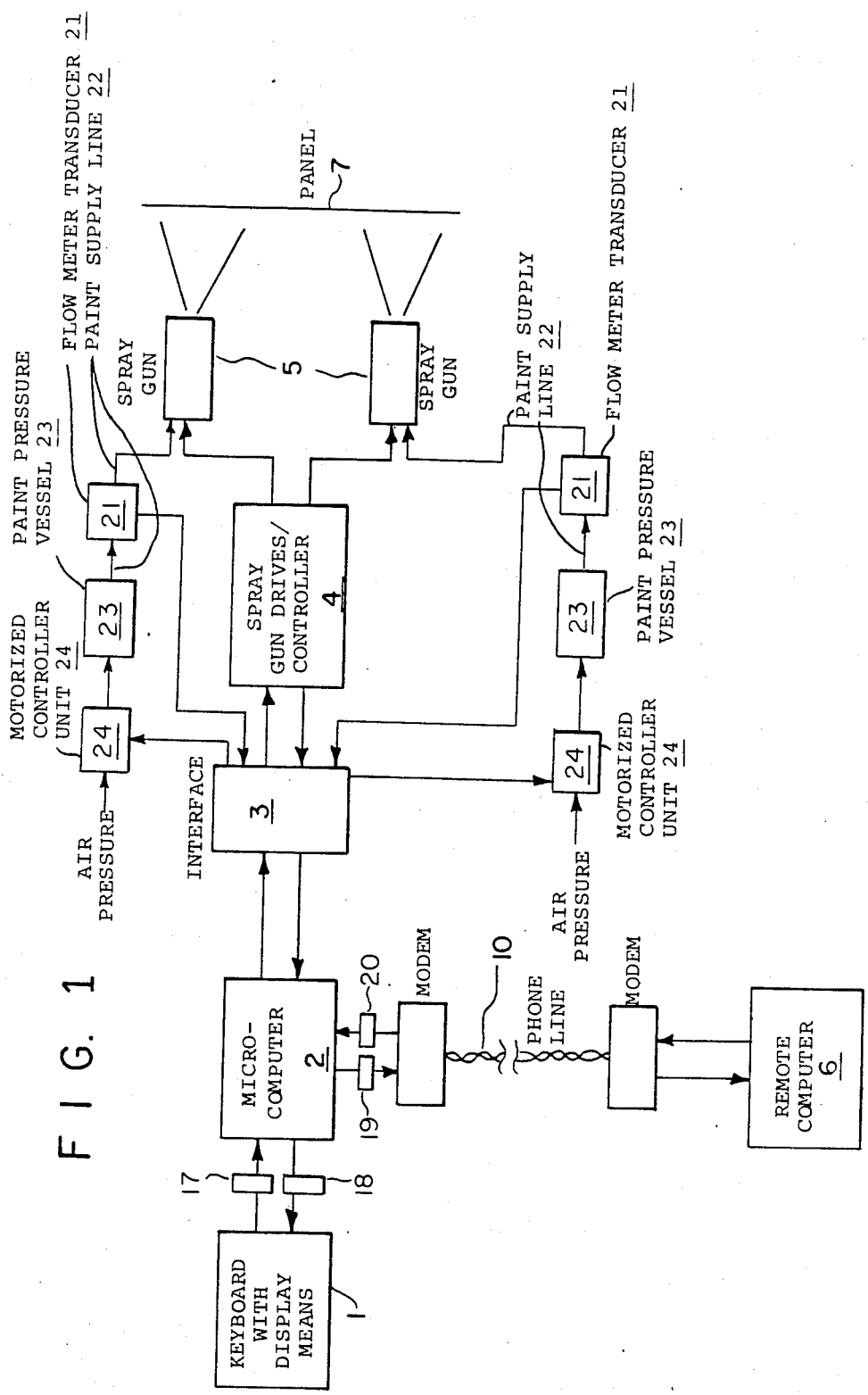
FIG. 1 is a schematic representation illustrating the major components of a spray machine incorporating the present invention.

Referring to FIG. 1, a keyboard 1, typically a RCA VP 611, with a display means, typically an IEE Corp 8822-95-080 permits a microcomputer 2, typically an Intel SBC 80/10B to be programmed to store various paint spraying procedures. Both the keyboard 1 and the microcomputer 2 are electrically powered through safety barriers (17-20) such as a Stahl Model No. 8901/31/280/165/80. These safety barriers allow the spray machine to be used in an area containing explosive solvent fumes, also called a classified environment as defined in The National Electrical Code Article 500. The electrical items used in the spray machine that do not utilize a safety barrier are either purged with air, i.e., under a positive air pressure or within explosion proof containers as required by The National Electrical Code.

In operation of the spray machine, referring to FIG. 1, the keyboard with display means 1 permits a microcomputer 2 to be programmed to store various spray procedures. The microcomputer 2 provides feedback to an operator utilizing the spray machine, via the keyboard with display means 1. The microcomputer 2 communicates in English with the operator via the display means portion of the keyboard. By communicating with the operator, the microcomputer 2 helps the operator properly prepare a spray procedure program. The microcomputer 2 identifies the paint spray parameters that must be set and will reject invalid, i.e, out-of-range, data regarding any spray procedure parameters. It is possible for an operator to prepare a spray procedure program by entering on the keyboard, actual operating units (e.g., inches/minutes, seconds, inches, etc.).

The microcomputer 2 is connected to interface 3, typically Model No. PSC 100 servo controllers made by Industrial Indexing Systems, Inc. Interface 3 converts an electronic signal from the microcomputer 2 to a signal which is fed to the spray gun drivers/controller 4 which contains the motors for the horizontal and vertical motion of the spray gun or guns 5 shown spraying a panel 7.

Typically, interface 3 contains numerous solid state drive relays such as Opto-22 Co. Model OAC5 for on-off control air solenoids and sensing devices such as Model IAC5 that determines information such as the position of the panel being sprayed, the horizontal and vertical motion of the spray gun and monitor purging system status of the electrical components and the like. This information is fed back to the microcomputer and corrections are made to keep with given spray parameters.

Optionally, in addition to the microcomputer 2 a remote computer 6 can be utilized. This remote computer would function in the same manner as the keyboard with display 1, i.e., the computer would feed in a program or spray parameters for a certain paint being tested. The advantage of a remote computer 6 is that a spray machine may then be part of a central spray procedure control network, allowing the network center to program or deprogram remote machines via a phone line modem connection 10. Typically, new spray procedures developed or modified can be transmitted from a central laboratory to paint manufacturing plants via the phone line modem connection.

Referring now to FIG. 2, an operator, desiring to utilize a particular spray procedure already programmed into the microcomputer 2 would enter the spray procedure program identification code on the alpha-numberic keyboard 1a. The identification code is inputted by the microcomputer 2 which then interrogates its memories 8a and 8b to find therein the procedure corresponding to the identification code. A typical nonvolatile read/write memory 8a is an Ampex MCM 8080 16k core stack and a typical read only memory 8b is an Intel SBC464 with 2716 memory chips. If the procedure is nonexistent, an error message is communicated to the operator via the display means 1b. If the procedure is present, the microcomputer 2 outputs to the alpha-numeric display means 1b a message that the machine is ready for operation.

The operator depresses a START CYCLE button, not shown, on the keyboard 1a which activates the microcomputer 2 and starts a spray procedure. The microcomputer 2 through the interface 3, activates the vertical motion means 4a and horizontal motion means 4b (both being part of the spray gun drive and control units 4, FIG. 1). The spray gun 5 controlled by spray gun controller 9 connected to interface 3 automatically sprays paint on positioned panel 7. A feedback circuit to microcomputer 2 also monitors the drive and control units 4 and, if necessary, will correct for any discrepancy between the operational parameters as programmed and as actually being carried out.

Vertical motion means 4a and horizontal motion means 4b utilizes servo motors to drive the spray gun, typically an Inland motor Kollmorgen Corp. Model No. TT2952C, and contain a motor amplifier SPR/X11522. The motors are modified to meet the specifications of Art. 500 of The National Electrical Code for operation within classified environments.

An operator can, in addition to calling up spray procedures already programmed into the microcomputer 2, insert new spray procedure programs into the nonvolatile read/write memory 8a of the microcomputer 2. To do so, the operator assigns to the new program an identification code, via the keyboard 1a. The microcomputer 2 verifys that the code chosen is unique, and if the code is unique, the microcomputer 2 will then request from the operator, via the display means 1b, information regarding the various parameters of the new procedure. The interface 3 converts the computer signals into signals compatible with the horizontal and vertical motion drive means 4a and 4b.

Figure 3:
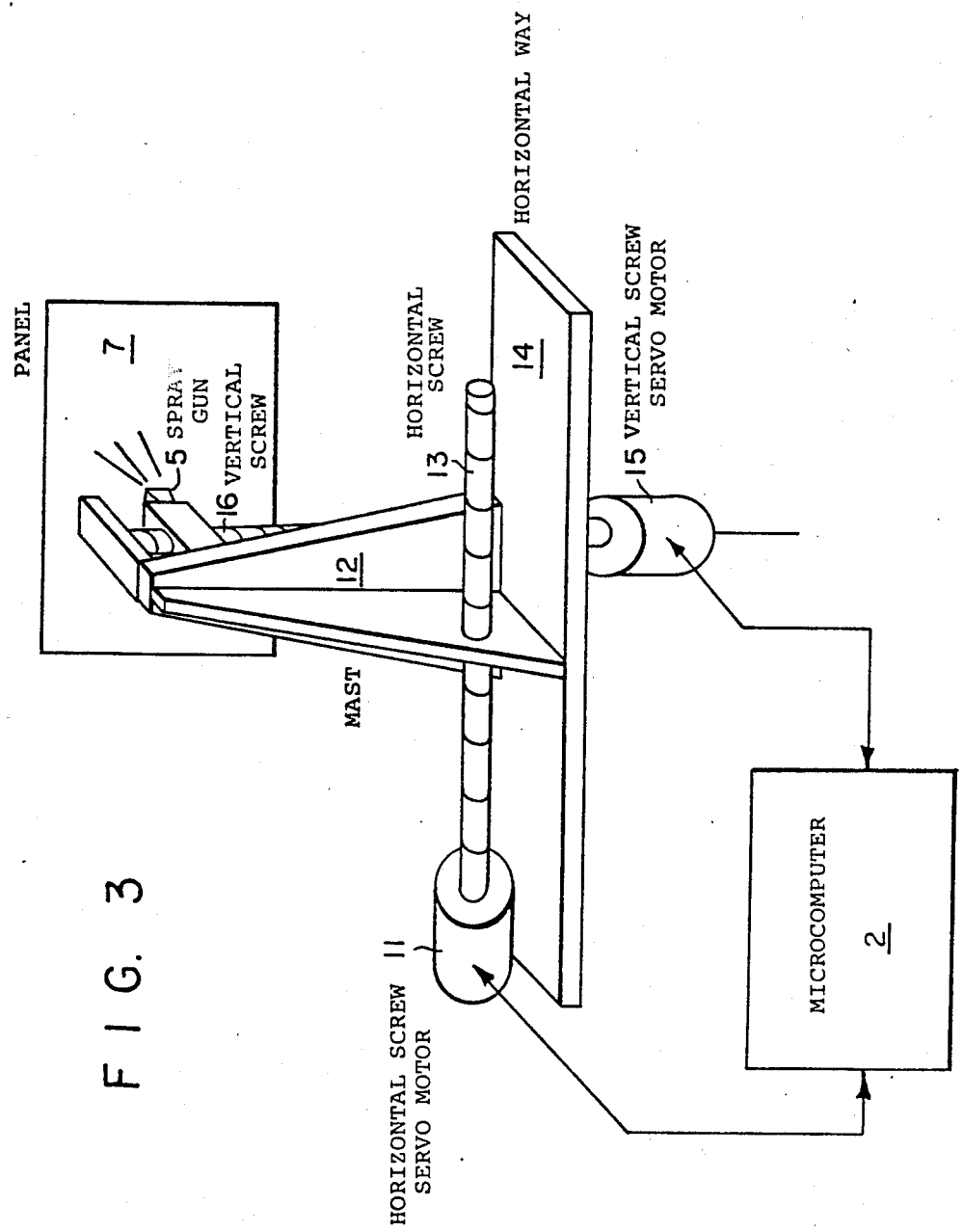
FIG. 3 is a more detailed representation of the spray gun and the drive controls of the spray gun.

FIG. 3 shows preferred embodiments for horizontal and vertical motion means driving spray gun 5 which is shown spraying panel 7. The horizontal motion means consist of a screw drive servo motor 11 that is capable of driving a mast 12 via screw 13, to which the spray gun 5 is attached along a horizontal way 14. The screw drive servo motor 11 is equipped with feedback encoders (not shown) capable of supplying the microcomputer 2 with data regarding horizontal motion acceleration, velocity and position of the spray gun 5.

The vertical motion means of FIG. 3 consist of a vertical screw servo motor 15 that is capable of turning a screw 16 to which the spray gun 5 is attached. The screw servo motor 15 is also equipped with feedback encoder (not shown) capable of supplying the microcomputer 2 with feedback data regarding vertical motion acceleration, velocity and position of the spray gun 5, and the microcomputer 2, if necessary, will correct for any discrepancies in the spray procedure.

Paints can have different viscosities which directly affect the flow of the paint through a spray gun. Temperature also affects paint viscosity and hence, paint flow. To provide identical spraying conditions for paints being tested, it is desirable to accurately control the flow of paint to the spray gun. This can be accomplished with minor additions of equipment to the spray machine.

To monitor the flow of paint (See FIG. 1), a flow meter transducer 21 is positioned in the paint supply line 22 which is connected to the spray gun 5 and a conventional pressure vessel 23 containing paint. In normal operation of a spray machine, paint is supplied from the pressure vessel 23 to the spray gun 5. The flow meter transducer 21 is electrically connected to the computer 2 via interface 3 and feeds paint flow information into the computer 2. The flow meter transducer 21 is a turbine type having a magnetic pick-up and a pulse frequency output signal proportional to the speed which the turbine is rotating which is proportional to the paint flow. The signal is fed to a readout attached to the flow meter transducer 21 which converts the signal to units that are proportional to paint flow and are fed directly to the microcomputer 2 via interface 3. Typically, a model MF30 Flowmeter Transducer manufactured by Hoffer Flow Meter Controls Inc. with an associated readout is used.

A controller unit 24 to control the air supply which pre-surizes the paint in the pressure vessel is electrically connected to the computer. The controller unit 24 is an automatic pressure regulator, typically a Fairchild 1210B-X-3.5 SFM-2-1C1-80331 Motorized Pressure Regulator. The motorized regulator is connected to the microcomputer 2 via solid state drivers which convert the digital output signals from the microcomputer to the modulated air pressure within the paint pressure vessel 23. The automatic valve throttles the air pressure supplied to it at about 90 pounds per square inch (psi) and controls the air pressure to the vessel 23 at about 0-15 psi.

In a typical paint spraying operation, the flow meter transducer 21 monitors paint flow and feeds this information back to the microcomputer 2 via interface 3. If the paint flow is below a desired amount, the microcomputer 2 automatically signals the controller unit 24 to provide additional air pressure to increase the paint flow. If the flow rate is higher than desired, the computer signals the controller units 24 to lower the air pressure which decreases paint flow.

Figure 1A:
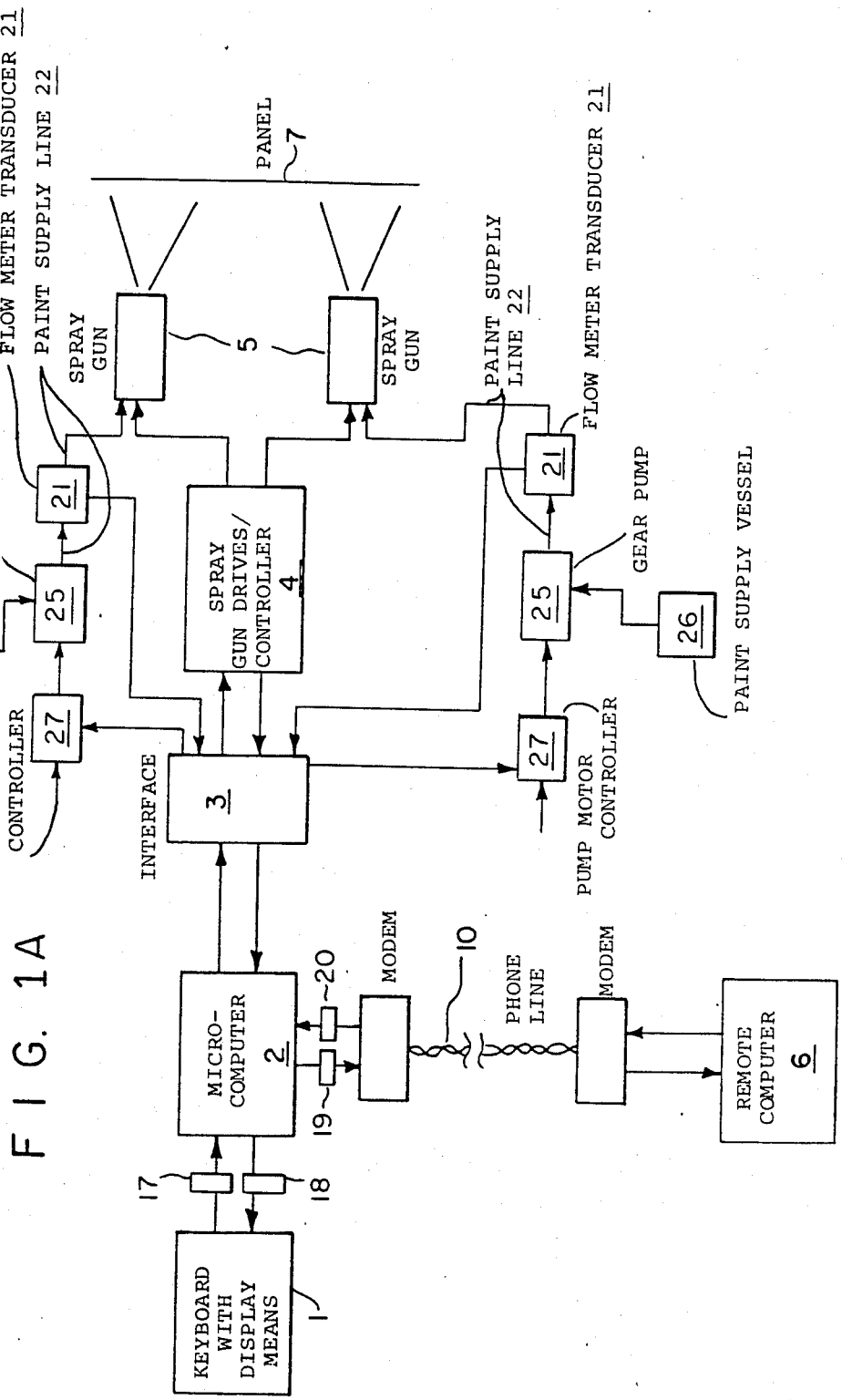
FIG. 1A is a schematic representation illustrating a modification of the spray machine.

Another aspect of the invention (Shown in FIG. 1A) is to use a gear pump 25 attached to a paint supply vessel 26 to pump paint to the spray gun. The gear pump is used in place of the pressure vessel. The advantage of a gear pump is that it pumps accurate volumes of paint and is not subjected to delays in response to a change of paint flow as is the pneumatic pressure system. One typical gear pump that can be used is a Zenith gear pump Model BLB-5456-20 made by Zenith-Nichols Company. The gear pump is driven by an electric motor which is coupled to a motor controller 27 electrically connected to the interface 3. The operation of the gear pump is the same as described above. The flow meter transducer which monitors paint flow feeds back paint flow information to the microcomputer 2 via interface 3 and the computer makes any needed adjustments and via interface 3 signals the motor controller to adjust the speed of the motor driving the gear pump to provide paint to the spray gun at a constant and uniform rate.

One of the advantages of the computerized spray machine is that each coat of paint applied to a panel can be applied using different spraying parameters. For example, different spray times, flash times, dwell times, and different horizontal and vertical application speeds can be used for each coat of paint applied. This is not practical with a conventional electro-mechanical spray machine.

What is claimed is:

1. An improved liquid paint spray machine for standard color panel preparation consisting essentially of a spray gun with an adjustable spray nozzle, said gun attached to a pressure vessel containing paint which feeds paint to the gun, means for controlling the speed and acceleration of the horizontal and vertical movement of the gun, means for controlling the number of passes by the gun, means for controlling the dwell period at the end of each pass and means for controlling the flash time between coats of paint applied by said gun; wherein the improvement comprises a computer system:
   i. having a memory storage means for storing programs for multiple paint spray procedures with specific operating parameters of the spray gun movement and paint flow to the spray gun for such procedures;
   ii. coupled to means capable of actuating, monitoring and correcting parameters of movement of the spray gun and paint flow to the spray gun to insure accurate spray application of a paint;
   iii. having feedback encoders which supply the computer with data of movement of the spray gun and paint flow to the spray gun so that the computer corrects for any discrepancy between operating parameters of a spray procedure as programmed and the actual parameters being carried out;
   iv. coupled to means that control and correct flow of paint to the gun from the pressure vessel containing paint wherein the means to control the flow of paint to the gun comprises a flow meter transducer positioned to monitor the flow of paint to the gun and is connected to the computer system through the feedback encoder and a motorized pressure regulator electrically connected to the computer system and connected to the pressure vessel containing paint, whereby the flow meter transducer monitoring paint flow feeds a signal to the computer system through the feedback encoder and in turn a signal is fed to the motorized pressure regulator to increase or decrease pressure to the pressure vessel to change the flow paint to the gun;
   v. having a keyboard with display means; wherein an operator of the spray machine can program spray procedure into the computer system by using a keyboard, with prompting from the computer via the display means.

2. The improved spray machine of claim 1 wherein all electrical components utilize a safety barrier or are under a positive air pressure thereby rendering the machine useable in an explosive atmosphere.

3. The improved spray machine of claim 1 in which means are provided to connect said machine to a remote computer.

4. The improved spray machine of claim 1 in which the computer system is programmed to provide separate spray parameters for each coat of paint being applied by the machine.

5. An improved liquid paint spray machine for standard color panel preparation consisting essentially of a spray gun with an adjustable spray nozzle, said gun attached to a vessel containing paint which feeds paint to the gun, means for controlling the speed and acceleration of the horizontal and vertical movement of the gun, means for controlling the number of passes by the gun, means for controlling the dwell period at the end of each pass and means for controlling the flash time between coats of paint applied by said gun; wherein the improvement comprises a computer system;
   i. having a memory storage means for storing programs for multiple paint spray procedures with specific operating parameters of spray gun movement and paint flow to the spray gun for such procedures;
   ii. coupled to means capable of actuating, monitoring and correcting parameters of movement of the spray gun and paint flow to the spray gun to insure accurate spray application of a paint;
   iii. having feedback encoders which supply the computer with data of movement of the spray gun and paint flow to the spray gun so that the computer corrects for any discrepancy between operating parameters of a spray procedure as programmed and the actual parameters being carried out;
   iv. coupled to means that control and correct flow of paint to the gun from the vessel containing paint wherein the flow measuring device is a flow meter transducer; and
   v. having a keyboard with display means; wherein an operator of the spray machine can program spray procedure into the computer system by using the keyboard, with prompting from the computer via the display means; wherein the means that control and correct flow of paint to the gun comprise a flow measuring device that monitors flow of paint to the gun and is connected to the computer system through the feedback encoder; a gear pump that pumps paint to the spray gun, a motor connected to the gear pump and drives the gear pump and a motor controller attached to the motor and to the computer system; whereby the flow measuring device monitoring the flow of paint feeds a signal to the computer system through the feedback encoder and in turn a signal is fed to the motor controller to increase or decrease the speed of the motor which drives the gear pump thereby changing the flow of paint to the spray gun.

* * * * *